United States Patent Office 2,842,513
Patented July 8, 1958

2,842,513

RESIN COMPOSITION CONTAINING EPOXIDIZED HYDROCARBON POLYMER AS RESIN PLASTICIZERS

William P. FitzGerald, Florham Park, and Paul V. Smith, Jr., Westfield, N. J., assignors to Esso Research and Engineering Company, a corporation of Delaware No Drawing. Application February 8, 1955
Serial No. 486,972

1 Claim. (Cl. 260—30.4)

This invention relates to epoxidizing polydienes. In one embodiment, liquid polybutadiene, or liquid copolymers of butadiene and styrene, is epoxidized by oxidation in the presence of a peracid or its salts or the like for a time and at a temperature sufficient to produce a new and useful product.

In one specific embodiment, a liquid copolymer of butadiene and styrene of low molecular weight is epoxidized by reaction with peracetic acid for a time and at a temperature sufficient to produce an epoxidized copolymer which is a viscous liquid.

The products of this invention, that is, the epoxidized polybutadiene or the epoxidized copolymers of butadiene and styrene, have been found to be particularly useful as plasticizers for resins and rubber-like materials.

An object of this invention is to provide new and useful epoxidation products of liquid polybutadiene.

Another object of this invention is to provide a new process for the epoxidation of liquid polybutadiene or copolymers of butadiene and styrene wherein novel starting materials are employed.

Another object of this invention is to provide a process for the epoxidation of liquid polybutadiene or copolymers of butadiene and styrene which produce a product not before known.

Still another object of this invention is to produce a new product which is useful as a plasticizer for resins and rubber-like materials. Other objects will be apparent to those skilled in the art upon reading the accompanying discussion and disclosure.

In the practice of one embodiment of this invention a liquid copolymer of butadiene and styrene having a viscosity of 0.15 to 22 poises at 50% N. V. M., preferably between .15 and 2.0 poises at 50% N. V. M., is epoxidized by reaction with a peracid or a compound capable of yielding oxygen in the presence of a solvent and at a temperature sufficient to yield the epoxidized copolymer.

Thus, in the practice of this invention, the unsaturated bonds of the aforementioned polymers or copolymers, which may be represented as $>C=C<$, are first converted by oxidation to the epoxide group

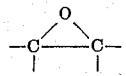

which forms a starting point for later substitutions. This oxidizing reaction may be continued until the polymer becomes completely saturated. The rate of oxidation or epoxidation varies greatly, depending upon the structure and type of polymer, the temperature, the presence or absence of catalyst, and the like.

The oxidation or epoxidation of the polymer may be complete or partial as desired. The degree of double bond saturation may be controlled by limiting the quantity of oxygen or oxygen-producing reagent used, or by control of the reaction conditions, e. g., temperature, catalyst, and/or time of reaction.

The choice of the polymer obviously is important. Preferred polymers are those of butadiene, the copolymers of butadiene with monoolefins such as butene, styrene, substituted styrene, nitriles such as acrylonitrile, methacrylonitrile, esters of acrylic and methacrylic acid, and the like, especially where the monoolefin forms a minor part of the polymer. Other diolefins such as isoprene, piperylene, etc. may be used in lieu of butadiene. In general, the polymers of low to moderate molecular weight having a substantial proportion of unsaturated carbon-carbon bonds are useful.

The desired polymers may be prepared by several known methods, i. e. (1) by emulsion polymerization as described in U. S. Patent No. 2,500,983 to Frolich; (2) by solution polymerization as described in U. S. Patent No. 2,586,594 to Gleason; (3) by peroxide polymerization as described in Gleason et al. Patent 2,581,094; or (4) by solution polymerization with an alkali-metal catalyst as described in copending applications Serial No. 176,771, filed July 29, 1950, U. S. Patent 2,762,851, and Serial No. 420,498 filed April 2, 1954, now abandoned. If desired these polmers may be partially hydrogenated in accordance with copending application Serial No. 432,936, filed May 27, 1954.

A particularly desirable polymeric raw material is the product obtained by the sodium copolymerization of butadiene and styrene in accordance with application Serial No. 420,498 which is a solution of polymer in a suitable hydrocarbon solvent such as solvent naphtha or mineral spirits. In appearance it is a clear, colorless to light yellow oily composition, the polymer content of which has a viscosity of about 0.15 to 22 poises at 50% N. V. M. and preferably 0.15 to 2.0 poises at 50% N. V. M.

Having selected the desired polymer, those of liquid butadiene-styrene type being preferred, the next step is to introduce the epoxide oxygen into the unsaturated bonds. In carrying out this operation the polymer is dissolved in a suitable solvent, such as normal heptane, benzene, chloroform, ethyl chloride or the like, and added to a solution of the oxidizing agent with vigorous agitation. Several hours may be required to complete the reaction, depending on the temperature, the type of polymer to be epoxidized and other factors. As oxidizing agents the peracids (R—COO₃H) or their salts, or the hydroperoxides may be used, the peracids such as peracetic and perbenzoic acid being preferred. Peracids may be prepared in any known manner, e. g. from the acyl peroxide as described by G. Braun on page 431 of Organic Synthesis, collective vol. 1, second edition (John Wiley & Sons, Inc., 1941), or by treating the acid or its anhydride with a peroxide such as hydrogen peroxide, Richter's Organic Chemistry, vol. I, page 319 (1934).

The epoxidation reaction of this invention is carried out at a temperature in the range of 0–95° C. and preferably in the range of 20–50° C. The time of reaction depends upon such factors as temperature and degree of epoxidation desired. However, the usual reaction time is in the range of 1 to 60 hours, preferably in the range of 6 to 30 hours. The mole ratio of $C_4$ units contained in the liquid polymer to peracid in the process may be from 1:1 to 4:1, preferably from 2:1 to 3:1. The resulting product contains from 1 to 9:5 weight percent epoxide.

The nature of the epoxidized product of this invention depends largely upon the extent to which the epoxidation reaction is carried out, the time and temperature of the reaction and the nature of the product produced. The reaction can be carried out such that a solid product is obtained which is insoluble in hydrocarbons. However, the epoxidation can also be carried out so that a viscous liquid or semi-solid product is produced which is soluble in hydrocarbons.

It is a preferred embodiment of this invention to use the novel epoxidation product of this invention as a plasticizer in plastic materials.

The ever-expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with small amounts of a diolefin such as isoprene have created a large demand for suitable plasticizers. Alkyl esters, such as the esters of open chain dibasic acids, e. g. esters of sebacic acid, adipic acid, and the like, and alkyl phthalates such as di-2-ethylhexyl phthalate, di-iso-octyl phthalate, di-n-octyl phthalate, and higher oxo phthalates, as well as tri-2-ethylhexyl phosphate have been used widely as plasticizers for the aforementioned high molecular weight materials.

In some applications, however, the present commercial plasticizers are deficient in thermal stability with the result that materials containing them tend to deteriorate rapidly under the conditions of use. This invention is concerned with the preparation and use of novel materials which, when added to typical commercial plasticizers, greatly improve the chemical and physical stability of the latter and prolong the useful life of the products in which they are incorporated.

The advantages of the invention will be better understood from a consideration of the following experimental data which are given for the sake of illustration, but without intention of limiting the invention thereto.

EXAMPLE I

An oily copolymer of butadiene and styrene was prepared according to the following recipe:

| | | |
|---|---|---|
| Butadiene | parts by weight | 80 |
| Styrene | do | 20 |
| Varsol | do | 10 |
| Naphtha | do | 190 |
| Dioxane | do | 30 |
| Sodium | do | 1.5 |
| Isopropanol | do | 0.3 |
| Temperature | ° C | 40 |

Complete conversion was obtained in 10 hours. The catalyst was destroyed and removed, and the product was finished to 90% N. V. M. as described above and had a viscosity of 1.0 poise at 50% N. V. M.

EXAMPLE II

In carrying out the epoxidation reaction the peracetic acid solution was placed in a 1-liter fluted flask and to it was added 200 grams of a 50% solution in normal heptane of a polymer oil similar to that described in Example I. This mixture was stirred vigorously for 28 hours at 20–27° C.

At the conclusion of the reaction, the mixture was washed six times with 250 ml. portions of water, after which the epoxide was taken up in dioxane and separated from the heptane. The epoxide was recovered, as a pale straw-colored semi-solid material, by distilling off the dioxane under vacuum.

Three epoxides were made from 0.4, 0.7 and 1.5 poise (at 100% N. V. M.) polymer oil. The products contained 2.11 weight percent epoxide.

EXAMPLE III

A polybutadiene oil prepared by sodium polymerization and having a viscosity of 1.8 poise at 70% N. V. M. and a Staudinger molecular weight of about 3000 was dissolved in n-heptane to make a 50% solution. A 200 gram sample of this solution was mixed with peracetic acid. The reaction and the product recovery were conducted in the same manner as described in Example II.

EXAMPLE IV

The effectiveness of the epoxidized oily polymer diisooctyl phthalate mixtures of this invention as plasticizers is shown in the runs evaluated in Table I wherein a commercial polyvinyl chloride resin known as Geon 101 was chosen as the illustrative material.

Three epoxidized oils were made in accordance with the synthesis procedure of Example II from 0.4, 0.7 and 1.5 poise (100% N. V. M.) polymer oils prepared similar to the recipe of Example I. These epoxidized oils are designated samples 1, 2 and 3 in Table I below.

In preparing the test samples, 150 grams of the resin were dry-blended by hand with 3 grams of sodium organo phosphate and 1.5 grams of dibasic lead stearate. Instead of the sodium organo phosphate, 1 to 5 parts per 100 parts of resin of other resin stabilizers could be used. The dry mixture was heated in a beaker with 75 grams of the epoxidized oil plasticizers and stirred to give a homogeneous blend whereupon the latter was charged to a 6 x 12 inch laboratory mill heated with steam to about 280 to 320° F. The resin was then fluxed about two minutes and allowed to mill with a rolling bank for five minutes with occasional cutting. Qualitative tests indicated that different combinations of vinyl resins and plasticizer required somewhat different mill temperatures to obtain a good mix in five minutes. After mill mixing, the stock was sheeted off at 0.075 to 0.15 inch thickness.

In general, it was observed that the novel phthalate ester mixtures of this invention flux or solvate high molecular weight vinyl resins at the usual milling temperatures noticeably faster than in the case of commercial phthalate plasticizers. This is a very important factor since it has long been recognized that prolonged exposure of a vinyl resin stock to heat during processing or later has a permanent adverse effect on the stability and physical properties of such a stock. Therefore, the improved fluxing properties of the plasticized resin in which these novel plasticizers are used makes it possible to reduce the total high temperature history of the resin stock.

The sheeted stock was then molded at 280° F. in a standard A. S. T. M. mold (D16–41) yielding slabs 6 x 6 x 0.075 inch. The molding cycle was 10 minutes at 900 lbs./sq. in. The molded slabs were allowed to stand at about 75° F. for at least one day before testing.

Tensile properties were determined in the usual manner on a Scott tester (model L-3) at about 75° F. and 50% relative humidity, the rate of jaw separation being 20 inches per minute. Heat aging characteristics were measured in a hot air circulating oven designed to give reproducible results. The specimens tested were cut from molded slabs with die C (ASTM D412–41).

The dynamic modulus was determined by measuring the force developed in a plasticized vinyl film under conditions of 10% static deformation and 0.7% oscillatory deformation at 15 cycles per second. Values are expressed in p. s. i. x $10^4$. The results are shown in Table I.

*Table I.—Epoxidized polymer oil as vinyl stabilizer*

|  | DIOP | Sample 1 | Sample 2 | Sample 3 |
|---|---|---|---|---|
| Composition of Vinyl Blend (pts. by wt.): | | | | |
| Geon 101 | 150 | | | |
| Vanstay [1] | 3 | | | |
| DS-207 [2] | 1.5 | | | |
| Plasticizer— | | | | |
| DIOP | 75 | 71.25 | 71.25 | 71.25 |
| Epoxidized polymer oil | | 3.75 | 3.75 | 3.75 |
| Original Properties: | | | | |
| Tensile | 2,895 | 2,980 | 2,845 | 2,885 |
| 100% Modulus | 1,995 | 2,100 | 2,030 | 1,995 |
| Elongation | 290 | 275 | 285 | 275 |
| 7 Days Aging @ 100° C.: | | | | |
| Tensile | 2,345 | 2,580 | 2,635 | 2,730 |
| 100% Modulus | 2,210 | 2,425 | 2,455 | 2,375 |
| Elongation | 150 | 180 | 180 | 220 |
| Percent Tensile-Elongation Retained | 81–52 | 87–65 | 93–63 | 95–80 |
| Volatility: 7 Days @ 100° C. (Percent Plasticizer Lost) | 15.7 | 13.5 | 17.2 | 13.0 |
| White Oil Extraction: 7 Days @ 52° C. (Percent Plasticizer Lost) | 9.3 | 6.8 | 7.8 | 7.4 |
| Dynamic Modulus × $10^4$: | | | | |
| +25° C | 1.40 | 1.78 | 1.76 | 1.86 |
| +10° C | 4.6 | 6.0 | 6.1 | 5.8 |
| −5° C | 13.0 | 15.5 | 15.7 | 15.2 |
| −20° C | 22.6 | 26.0 | 25.4 | 25.4 |

| Sample No. | Copolymer Oil Used, poise | Mol. Wt. | Epoxide in Product, Wt. Percent |
|---|---|---|---|
| DIOP—di-iso-octyl phthalate | | | |
| 1 | 0.4 | 4,000 | 2.11 |
| 2 | 0.7 | 6,000 | 2.11 |
| 3 | 1.5 | 10,000 | 2.11 |

[1] Sodium organo phosphate.
[2] Dibasic lead stearate.

The data in Table I show that the replacement of 5 wt. % of the di-iso-octyl phthalate (DIOP) by epoxidized copolymer oil of Example II reduces the volatility and the white oil extractability of the di-iso-octyl phthalate far more than would be expected on the basis of simple replacement with a less volatile material. The most noteworthy effect of the epoxidized polymer oil, however, is the greatly improved thermal stability of the vinyl blends, as indicated by the "Percent Tensile-Elongation Retained." The two polymer oil samples with the lowest molecular weights (samples #1 and #2) raise the heat stability of di-iso-octyl phthalate to a generally acceptable level. The polymer oil sample #3 derived from the highest molecular weight polymer and containing the highest number of epoxy groups, however, increases the heat stability of the di-iso-octyl phthalate to an outstandingly high level, far superior to most commercial plasticizers. An additional advantage for the use of the epoxidized oil lies in the fact that it stabilizes the vinyl resin against decomposition due to splitting off HCl. Any HCl split off is easily detected because of the fact that it reacts with the lead oxide present forming $PbCl_2$ which renders vinyl films opaque. In the above experiments the films containing the epoxidized polymer showed varying degrees of transparency, this property increasing with the number of epoxide groups. The sample #3 containing the highest number of epoxide groups was quite clear, demonstrating that the formation of $PbCl_2$ had been prevented.

EXAMPLE V

The effectiveness of the epoxidized oily polymers when added to di-iso-octyl phthalate is further shown in the series of experiments evaluated in Table II. In these tests the composition of the vinyl resin blend and the method of compounding the samples were the same as described in Example IV. The data shown for runs A and B indicate that lower (2.5%) and higher (7.5%) concentrations of the epoxidized copolymer oil, sample 3 of Example II, are somewhat less effective from the standpoint of stability than the 5% concentration of sample 3, Table I. From these results it is apparent that the optimum concentration obtains when about 5% of the DIOP in the recipe is replaced with the epoxidized polymer oil.

The data of run C, Table II, indicate that the epoxidized polybutadiene from Example III gives resin stabilities about equal to the best epoxidized copolymer mixture, and at the same time is decidedly superior as regards plasticizer efficiency.

*Table II*

|  | DIOP | Sample A | Sample B | Sample C |
|---|---|---|---|---|
| Composition of Vinyl Blend (pts. by wt.): | | | | |
| Geon 101 | 150 | | | |
| Vanstay | 3 | | | |
| DS-207 | 1.5 | | | |
| Plasticizer— | | | | |
| DIOP | 75 | 73.13 | 69.38 | 71.25 |
| Epoxidized polymer oil | | [1] 1.87 | [1] 5.62 | [2] 3.75 |
| Original Properties: | | | | |
| Tensile, p. s. i. | 2,900 | 2,900 | 2,870 | 2,840 |
| 100% Modulus, p. s. i. | 1,970 | 1,965 | 1,945 | 1,905 |
| Elongation, percent | 300 | 305 | 315 | 305 |
| Aged 7 Days @ 100° C.: | | | | |
| Tensile | 2,485 | 2,545 | 2,840 | 2,835 |
| 100% Modulus | 2,340 | 2,355 | 2,525 | 2,495 |
| Elongation | 150 | 175 | 235 | 235 |
| Percent Tensile-Elongation Retained | 85.7–50 | 87.8–57.4 | 99–74.6 | 99.8–77.0 |
| Volatility after 7 Days @ 100° C.: Percent Plasticizer Loss | 17.5 | 16.8 | 18.7 | 20.5 |
| Primol D Extraction after 7 Days @ 52° C.: Percent Plasticizer Loss | 9.8 | 9.0 | 7.7 | 8.7 |
| Dynamic Modulus × $10^4$: | | | | |
| +25° C | 1.45 | 1.56 | 1.93 | 1.61 |
| +10° C | 4.7 | 5.5 | 6.1 | 5.5 |
| −5° C | 12.4 | 14.1 | 15.4 | 14.3 |
| −20° C | 22.5 | 24.3 | 26.7 | 25.1 |

[1] Epoxidized copolymer oil, same as sample 3, Table I.
[2] Epoxidized polybutadiene oil of Example III.

In summary, the invention relates to mixtures of epoxidized hydrocarbon polymers and di-iso-octyl phthalate as plasticizers for resin compositions. The plasticizer mixture is used in proportions from about 5 to 100 parts, preferably 30 to 60 parts, per 100 parts of resin. The plasticized mixture itself consists of about 90 to 99% di-iso-octyl phthalate and 1 to 10, preferably 5%, of epoxidized hydrocarbon polymer. Polymeric materials which lend themselves to successful plasticization with the esters of the invention include the various vinyl resins such as polyvinyl chloride, polyvinyl acetate, polyvinyl alcohol, mixed polymers of vinyl chloride with vinyl acetate, or vinylidine chloride, polyvinyl butyral or other polyvinyl acetals; nitrocellulose, ethyl cellulose; rubber-like polymers of diolefinic materials such as butadiene-nitrile (GR–A), butadiene-styrene (GR–S) or polychloroprene elastomers, or isobutylene-diolefin copolymers of the GR–I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber of 15 to 40% nitrile. It will be understood, of course, that in addition to the plasticizer, the polymer compositions may also contain conventional stabilizers such as basic lead carbonate, sodium borate or the like, oleic acid, auxiliary plasticizers or softeners, fillers, pigments and eventually also curing agents, when the polymer is of the curable type.

It will be understood further that the foregoing examples have been given merely for purposes of illustration, but that other modifications of the present invention are possible without departing from the scope of the appended claim.

The nature of the present invention having been thus fully set forth and specific examples of the same given, what is claimed as new and useful and desired to be secured by Letters Patent is:

A plastic composition of matter comprising polyvinyl chloride resin and, as a plasticizer therefor 5 to 100 parts by weight per 100 parts of resin of a mixture of 95 weight percent of diiso-octyl phthalate and 5 weight percent of an oily epoxidized diolefin polymer containing 2.11 weight percent

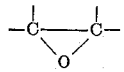

groups, said epoxidized diolefin polymer having been prepared by copolymerizing 80 weight percent butadiene and 20 weight percent styrene in the presence of sodium to produce an oily diolefin polymer having a molecular weight of 10,000 and a viscosity of 1.5 poise at 100 percent non-volatile content and subsequently subjecting the oily diolefin polymer to the requisite epoxidizing reaction conditions.

References Cited in the file of this patent

UNITED STATES PATENTS

| | | |
|---|---|---|
| 2,490,247 | Amberg | Dec. 6, 1949 |
| 2,590,059 | Winkler | Mar. 18, 1952 |
| 2,660,563 | Banes et al. | Nov. 24, 1953 |
| 2,671,064 | Cowell et al. | Mar. 2, 1954 |